(12) United States Patent
Chang

(10) Patent No.: US 11,313,433 B2
(45) Date of Patent: Apr. 26, 2022

(54) SHOCK ISOLATOR ASSEMBLY FOR A VEHICLE MOUNTED PAYLOAD

(71) Applicant: Raytheon Company, Waltham, MA (US)

(72) Inventor: Eric E-Lee Chang, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/877,344

(22) Filed: May 18, 2020

(65) Prior Publication Data

US 2021/0215223 A1 Jul. 15, 2021

Related U.S. Application Data

(60) Provisional application No. 62/961,648, filed on Jan. 15, 2020.

(51) Int. Cl.
*F16F 15/02* (2006.01)
*B60P 7/16* (2006.01)
*F16F 7/12* (2006.01)

(52) U.S. Cl.
CPC .............. *F16F 15/022* (2013.01); *B60P 7/16* (2013.01); *F16F 7/125* (2013.01)

(58) Field of Classification Search
CPC ............ F16F 15/022; F16F 7/125; B60P 7/16
See application file for complete search history.

(56) References Cited

U.S. PATENT DOCUMENTS

| 3,171,643 | A  | * | 3/1965 | Roos ....................... | F16F 9/585 |
| | | | | | 267/64.15 |
| 3,592,422 | A  |   | 7/1971 | Norman | |
| 5,220,706 | A  | * | 6/1993 | Bivens ..................... | E05F 3/02 |
| | | | | | 16/66 |
| 5,224,689 | A  | * | 7/1993 | Georgiev .................. | F16F 3/04 |
| | | | | | 267/168 |
| 6,022,005 | A  | * | 2/2000 | Gran ..................... | F16F 15/005 |
| | | | | | 244/164 |
| 6,098,966 | A  | * | 8/2000 | Latvis, Jr. .............. | F16F 13/00 |
| | | | | | 267/221 |
| 6,237,795 | B1 | * | 5/2001 | Buckley ................ | B64G 1/641 |
| | | | | | 220/1.5 |
| 7,066,455 | B2 | * | 6/2006 | Adeline .................. | F16F 1/128 |
| | | | | | 267/168 |

(Continued)

OTHER PUBLICATIONS

Ishida et al., Design and Experimental Analysis of Origami-Inspired Vibration Isolator With Quasi-Zero-Stiffness Characteristic, Journal of Vibration and Acoustics, Oct. 2017, 5 pages, vol. 139, American Society of Mechanical Engineers, New York, New York.

(Continued)

*Primary Examiner* — Vishal R Sahni

(57) ABSTRACT

A shock isolator assembly comprises a base a platform and a plurality of self-resetting buckling isolators providing a three-stage response to a dynamic load acting between the base and the platform. The three-stage response of the self-resetting buckling isolators comprises a tension stage when the dynamic load exceeds a threshold tension load, a compression stage when the dynamic load exceeds a threshold compression load, and a rigid stage when the dynamic load is below the threshold tension load and the threshold compression load.

11 Claims, 9 Drawing Sheets

(56) References Cited

U.S. PATENT DOCUMENTS

| | | | | |
|---|---|---|---|---|
| 7,281,704 | B2* | 10/2007 | Salice | E05F 5/02 |
| | | | | 188/297 |
| 8,327,985 | B2* | 12/2012 | Boyd | F16F 15/023 |
| | | | | 188/379 |
| 2003/0111309 | A1* | 6/2003 | Nishizawa | G09B 23/08 |
| | | | | 188/299.1 |
| 2003/0155194 | A1* | 8/2003 | Kienholz | F16F 15/0232 |
| | | | | 188/267 |
| 2003/0213663 | A1* | 11/2003 | Salice | E05F 5/02 |
| | | | | 188/284 |
| 2004/0195065 | A1* | 10/2004 | Folkens | F16F 15/023 |
| | | | | 188/380 |
| 2009/0278292 | A1 | 11/2009 | Retat et al. | |
| 2013/0277500 | A1* | 10/2013 | Miller | F16F 15/02 |
| | | | | 244/131 |
| 2015/0136937 | A1* | 5/2015 | Xu | F16F 15/02 |
| | | | | 248/566 |
| 2015/0233441 | A1* | 8/2015 | Witwer | F16F 9/16 |
| | | | | 188/276 |

OTHER PUBLICATIONS

Madani et al., Free Vibration Analyses of Hexapod Machine tool Set, Cumhuriyet Science Journal, May 2015, 7 pages, vol. 36, No. 3, Cumhuriyet University, Turkey.

Zhou et al., A Six Degrees-of-Freedom Vibration Isolation Platform Supported by a Hexapod of Quasi-Zero-Stiffness Struts, Journal of Vibration and Acoustics, Jun. 2017, 5 pages, vol. 139, American Society of Mechanical Engineers, New York, New York.

International Search Report for International Application No. PCT/US2020/060790 dated Mar. 12, 2021, 15 pages.

* cited by examiner

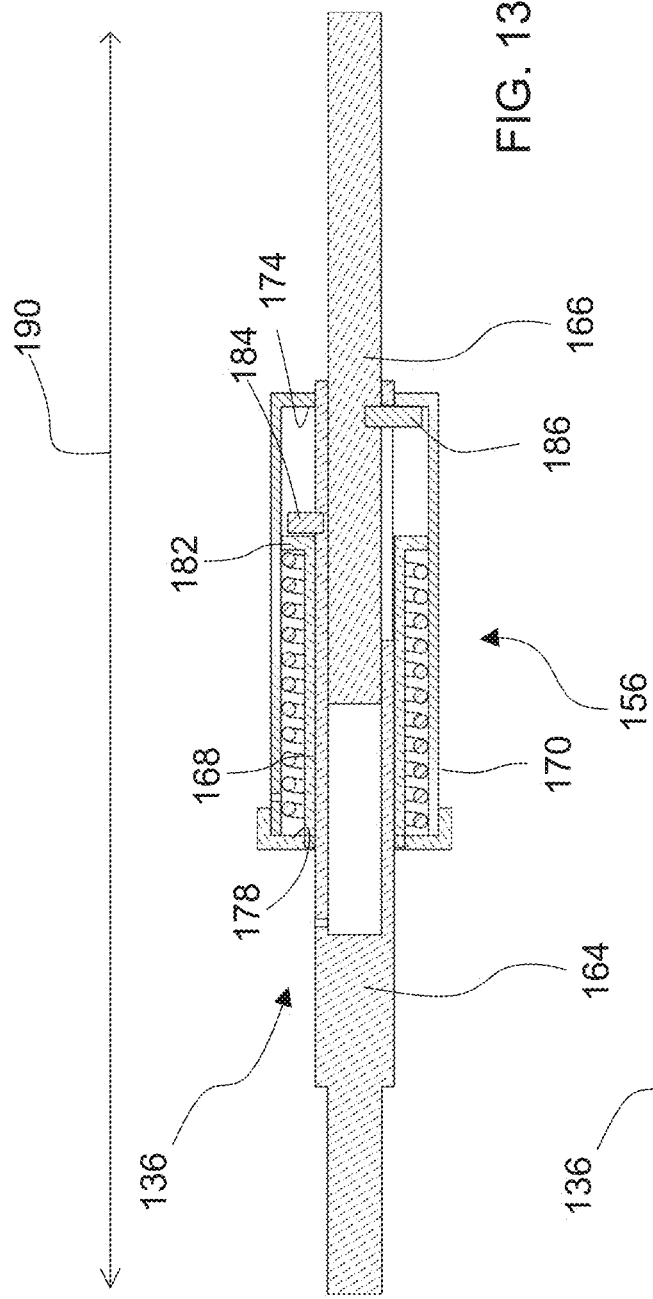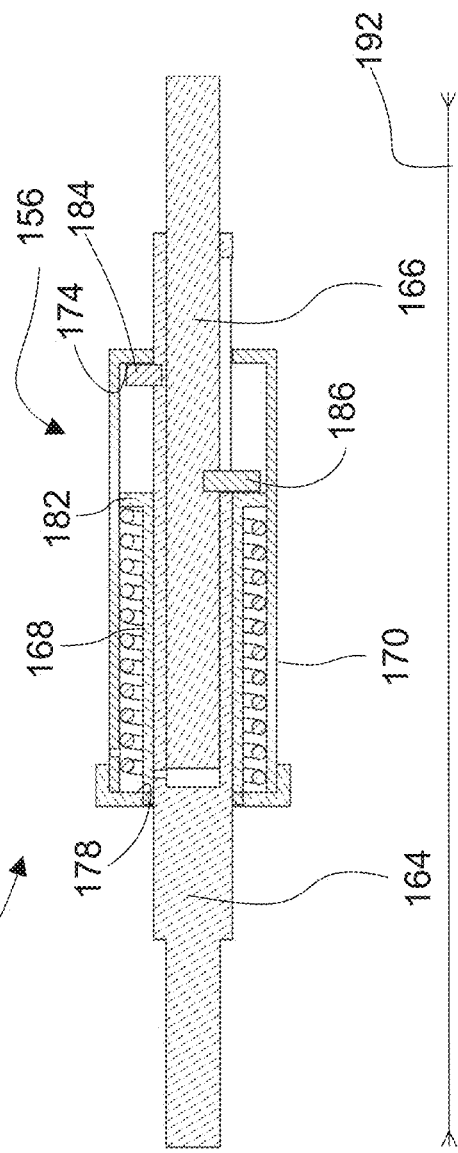

SHOCK ISOLATOR ASSEMBLY FOR A VEHICLE MOUNTED PAYLOAD

RELATED APPLICATIONS

This application claims the benefit of U.S. Provisional Patent Application No. 62/961,648, filed Jan. 15, 2020, and entitled, "Shock Isolator Assembly for a Vehicle Mounted Payload," which is incorporated by reference in its entirety herein.

BACKGROUND

Sensor payloads, such as imaging sensors (e.g., cameras), can be mounted to mobile vehicles, such as aircraft, land vehicles, and watercraft using a payload mount system coupled to the mobile vehicle. The coupling often rigidly secures the payload mount system to prevent the sensors from uncontrolled movement during use. However, a rigid coupling for the payload mount system is not always beneficial. For example, rapid acceleration and deceleration forces, vibrations, shock or impact loads and other forces originating from or propagating through the mobile vehicle at certain times can be transmitted to the sensors through the rigid coupling of the payload mount system potentially negatively impacting the future performance of the sensors, or even damaging the sensors. Indeed, mobile vehicles commonly experience rapid accelerations and decelerations during their normal use, but when the sensor payloads are not necessarily in use. For example, an aircraft can experience rapid deceleration during a landing event. Or, a land-based vehicle may experience rapid accelerations when encountering rough terrain at high speeds. Furthermore, there may be instances in which uncontrolled movement of the payload mount system is desirable. For example, if an object were to collide with the payload mount system it would be preferable for the payload mount system, or one or more components of the system, to displace a predetermined amount and absorb or account for the resulting forces acting on the system (e.g., give) rather than the system act as a rigid body, potentially damaging the payload mount system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

FIG. 13 illustrates a cross-sectional side view of the three-stage self-resetting buckling isolator of FIG. 11, with the self-resetting buckling isolator being shown in a tension stage.

FIG. 14 illustrates a cross-sectional side view of the three-stage self-resetting buckling isolator of FIG. 3, with the self-resetting buckling isolator being shown in a compression stage.

Figure 1:
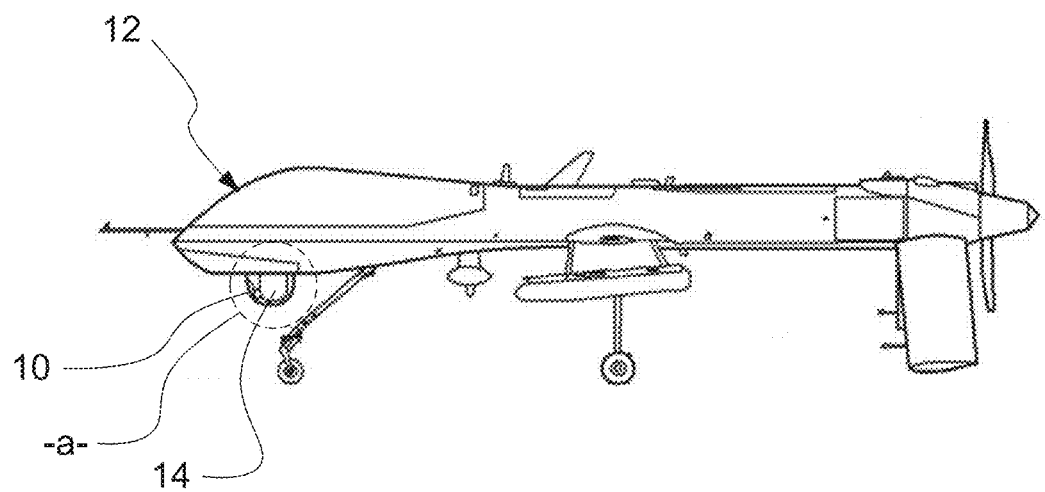
FIG. 1 illustrates a side view of a payload mount system supported on a mobile vehicle in the form of an aircraft, and specifically a drone.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

In one example, disclosed is a shock isolator assembly. The shock isolator assembly comprises a base, a platform, and a plurality of buckling isolators providing a three-stage response to an applied dynamic load acting between the base and the platform. The three-stage response comprises a tension stage when the dynamic load exceeds a threshold tension load, a compression stage when the dynamic load exceeds a threshold compression load, and a rigid stage when the dynamic load is below the threshold tension load and the threshold compression load.

In accordance with a more detailed aspect, the shock isolator assembly can further comprise a payload mount system coupled to the platform and one or more elastomeric members (e.g., one or more elastomeric sheets or pads) between the platform and the payload mount system. The one or more elastomeric members can dampen vibrations of the payload mount system.

In accordance with a more detailed aspect, each of the self-resetting buckling isolators of the shock isolator assembly can comprise a first end coupled to one of the base or the platform, a second end opposing the first end and coupled to the other of the base or the platform, and a preloaded coupler coupling the first end to the second end. The preloaded coupler can facilitate relative axial movement between the first end and the second end, and the preloaded coupler has a preload in a first axial direction and a preload in a second axial direction opposite the first axial direction. The preload in the first and second axial direction inhibits relative movement in the first direction until the preload in the first axial direction is overcome and inhibits relative movement in the second direction until the preload in the second axial direction is overcome.

In accordance with a more detailed aspect, each of the self-resetting buckling isolators can further comprise a first preloaded bias spring biasing the first end away from the second end, and a second preloaded bias spring biasing the first end towards the second end.

In accordance with a more detailed aspect, each of the self-resetting buckling isolators can further comprise a first socket coupled to the first end, a second socket coupled to the second end, a floating socket slidable relative to the first socket and the second socket (and in some examples, located within the first socket and housing the second socket), and a cap securing the floating socket relative to the first socket. The first preloaded bias spring can bias the floating socket away from the cap and the second preloaded bias spring can bias the floating socket away from the second socket.

In accordance with a more detailed aspect, the platform can be moveable relative to the base in six degrees of freedom during the tension stage and the compression stage.

In accordance with a more detailed aspect, the plurality of self-resetting buckling isolators can comprise six self-resetting buckling isolators.

In accordance with a more detailed aspect, each of the self-resetting buckling isolators can comprise a first end coupled to one of the base or the platform, a second end opposing the first end and coupled to the other of the base or the platform, and a preloaded coupler coupling the first end to the second end. The preloaded coupler can facilitate relative axial movement between the first end and the second end and has a preload so as to inhibit relative movement in a first axial direction and a second axial direction opposite the first axial direction until the preload is overcome.

Also is disclosed is a three-stage self-resetting buckling isolator in accordance with an example. The three-stage self-resetting buckling isolator comprises a first end having an interface operable to couple to one of a platform or a base, a second end opposing the first end and having an interface operable to couple to the other of the platform or the base, and a preloaded coupler coupling the first end to the second end. The preloaded coupler facilitates relative axial movement between the first end and the second end. The pre- loaded coupler biases the first and second end away from each other in an axial direction and the first and second ends towards each other in an axial direction opposite the first axial direction. The buckling isolator comprises a rigid stage that inhibits relative movement in the first axial direction and second axial direction when an applied dynamic load is less than a threshold compression load of the buckling isolator and less than a threshold tension load of the buckling isolator, a compression stage that facilitates axial compression when the dynamic load is greater than the threshold compression load of the buckling isolator, and a tension stage that facilitates axial elongation when the dynamic load is greater than the threshold tension load of the buckling isolator.

In accordance with a more detailed aspect, the preloaded coupler can comprise a first preloaded bias spring and a second preloaded bias spring, wherein the threshold tension load is provided by the first preloaded bias spring and the threshold compression load is provided by the second preloaded spring.

In accordance with a more detailed aspect, the preloaded coupler can further comprise a first socket coupled to the first end, a second socket coupled to the second end, a floating socket slidable relative to the first socket and the second socket (and in some examples, located within the first socket and housing the second socket), and a cap securing the floating socket relative to the first socket. The first preloaded bias spring can bias the floating socket away from the cap and the second preloaded bias spring can bias the floating socket away from the second socket.

In accordance with a more detailed aspect, the threshold tension load and the threshold compression load can be provided by a single spring In accordance with a more detailed aspect, the preloaded coupler can further comprise a floating socket, a fixed socket, a shaft, a floating sleeve and a preloaded spring. The floating socket can have comprise an internal cavity, a first end having a first aperture, and a second end having a second aperture. The fixed socket can be coupled to the first end and extend through the first aperture. The fixed socket can comprise a longitudinal slot and a first pin extending radially outward away from the fixed socket. The shaft can be coupled to the second end and extend through the second aperture. The shaft can comprise a second pin extending radially outward from the shaft and extending through the longitudinal slot. The floating sleeve can be located within the internal cavity and about the fixed socket. The floating sleeve can be slidable relative to the fixed socket and the floating socket. The preloaded spring can bias the floating sleeve away from the first end of the floating socket. The first pin can be located between the floating sleeve and the second end of the floating socket and configured to cause the floating socket to move towards the first end of the floating socket in response to compression of the three-stage self-resetting buckling isolator, and the second pin can be located between the floating sleeve and the second end of the floating socket and configured to cause the floating socket to move towards the first end of the floating socket in response to elongation of the three-stage self-resetting buckling isolator.

In accordance with a more detailed aspect, the floating socket can comprise a cap at the first end.

In accordance with a more detailed aspect, the interface for coupling the first end to one of a platform or a base comprises a universal joint, and the interface for coupling the second end to the other of a platform or a base comprises a universal joint.

In accordance with a more detailed aspect, the first preloaded bias spring and the second preloaded bias spring can have the same spring constant, or they can have a different spring constant.

In accordance with a more detailed aspect, the preload of the first preloaded bias spring and the preload of the second preloaded bias spring can be the same, or the preloads can be different.

Also is disclosed is a method for mounting a sensor assembly to a vehicle for reducing shock loads of the sensor assembly. The method comprises securing a first end of each of a plurality of three-stage self-resetting buckling isolators to a vehicle and securing a second end of each of the plurality of three-stage self-resetting buckling isolator to a payload mount system in support of a payload (e.g., a sensor assembly). Each of the three-stage self-resetting buckling isolators comprise and are operable in a rigid stage, a compression stage, and a tension stage, and wherein the plurality of three-stage self-resetting buckling isolators operate to inhibit movement of the payload (e.g., sensor assembly) relative to the vehicle when in the rigid stage. The plurality of three-stage self-resetting buckling isolators operate in the tension stage when a dynamic load exceeds a threshold tension load. The plurality of three-stage self-resetting buckling isolators operate in the compression stage when a dynamic load exceeds a threshold compression load.

In accordance with a more detailed aspect, the plurality of three-stage self-resetting buckling isolators can comprise six three-stage self-resetting buckling isolators.

In accordance with a more detailed aspect, the first end of each three-stage self-resetting buckling isolator can be secured to the vehicle by a universal joint and the second end of each three-stage self-resetting buckling isolator can be secured to the payload mount system by a universal joint.

In accordance with a more detailed aspect, the sensor assembly can be supported in a position below the vehicle.

In accordance with a more detailed aspect, the sensor assembly can be supported in a position above the vehicle.

To further describe the present technology, examples are now provided with reference to the figures. FIG. 1 illustrates an example payload mount system 10 coupled to or otherwise supported by a vehicle 12. In the example shown, the vehicle 12 is in the form of an aircraft, although this is not intended to be limiting in any way. The payload mount system 10 can comprise a sensor assembly including a sensor, gimbal joints, and actuators for manipulating the sensor assembly. For example, the payload mount system 10 can comprise an azimuthal gimbal enabling rotation of the sensor assembly about a vertical axis, and an elevation gimbal enabling rotation of the sensor assembly about a horizontal axis. The payload mount system 10 can further comprise an outer shell 14 protecting the sensor assembly.

Figure 1A:
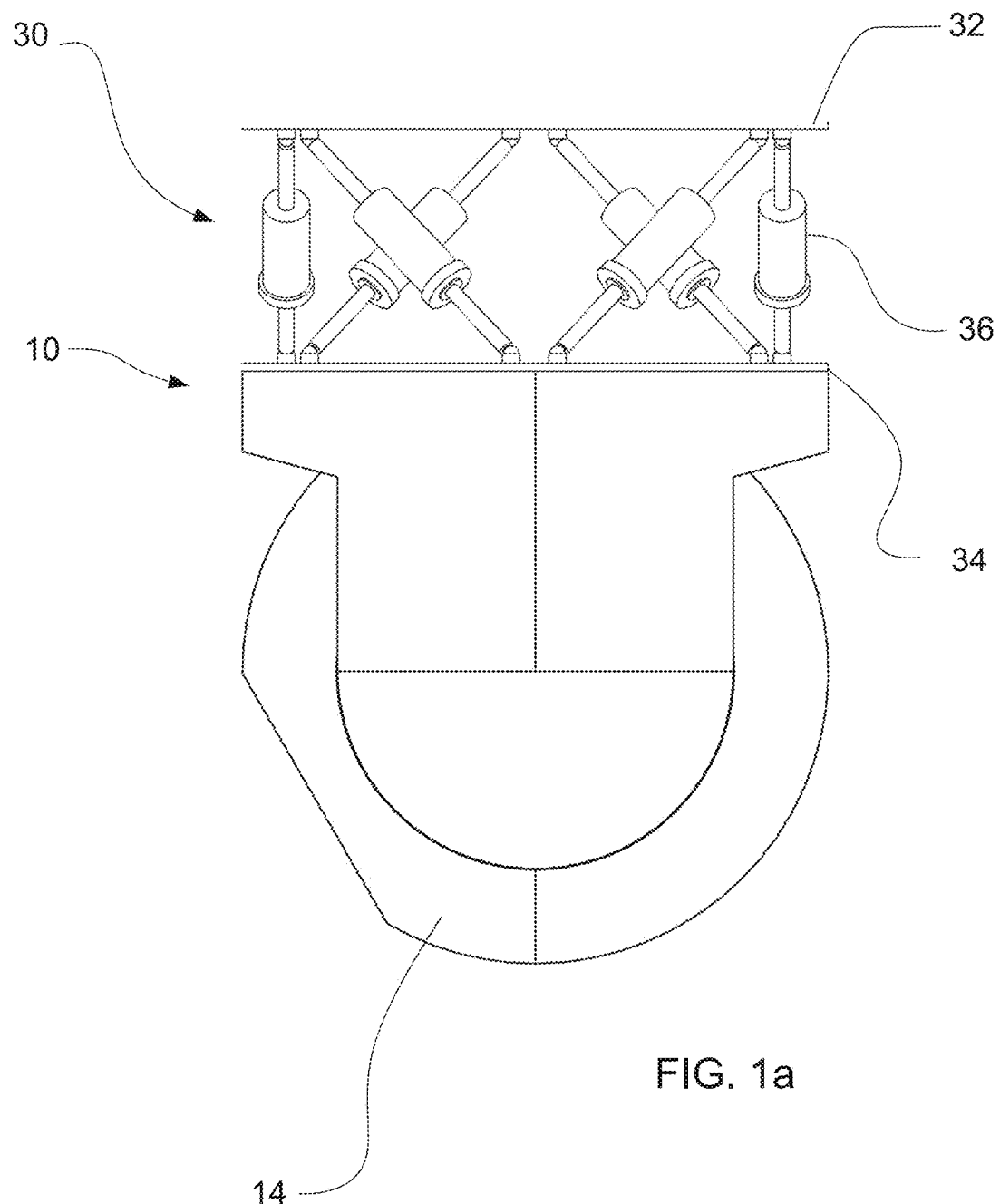
FIG. 1a illustrates a detailed view of the payload mount system shown in FIG. 1 taken about circle—a—shown in FIG. 1.

FIG. 1a illustrates a detailed view of the example payload mount system 10 coupled to the vehicle 12 by way of a shock isolator assembly 30. The shock isolator assembly 30 can comprise a plurality of self-resetting buckling isolators as described herein. In on example, the shock isolator assembly 30 can comprise a plurality of self-resetting buckling isolators 36 rotatably coupled to a base 32 and to a platform 34. The platform 34 can comprise a component of a payload mount system 10 or a separate component that the payload mount system 10 couples or mounts to. In one example, the platform 34 can comprise a gimbal structure of the payload mount system 10. In another example, the platform 34 can comprise a rotating mount of the payload mount system 10. In still another example, the platform 34 can comprise a surface that a gimbal structure or a rotating mount of the payload mount system 10 can secure to. The base 32 can comprise a component of a vehicle, such as a portion of a body (e.g., an outer panel of the body of the vehicle) or a frame of the vehicle, or any structure on the vehicle capable of supporting and securing the base 32, and supporting the shock isolator assembly 30 and the payload mount system 10. In another example, the base 32 can comprise a separate structure configured to couple or mount to the vehicle.

In normal use or under normal operating conditions (usage where no shock or other undesirable loads above a given threshold are being experienced), the payload mount system 10 can be configured to behave or perform as if rigidly coupled to the vehicle 12 by way of a shock isolator assembly. As will be described later, the shock isolator assembly enables the sensor assembly to be selectively positioned relative to the vehicle 12 (e.g., via one or more actuators), but also facilitates displacement of the payload mount system 10 relative to the vehicle 12 in response to shock loads (loads acting on the payload mount system 10 that are above a given or predetermined threshold). In some examples, the shock isolator assembly can be configured to facilitate displacement of the payload mount system 10 in up to six degrees of freedom relative to the vehicle 12 in response to shock loads above a given threshold. For example, the vehicle 12, being shown in the form of an aircraft, can experience a shock load of some magnitude proportional to and in response to the impact of the aircraft with the ground during a landing event, which causes the aircraft to rapidly decelerate in the vertical direction. However, in some instances, the landing of the aircraft may cause the payload mount system 10 to experience shock loads in more than one direction, or in other words, along or about more than one axis. As such, the shock isolator assembly can be configured to account for and isolate shock loads acting along (axial shock loads) or about (shock loads inducing rotation of the payload mount system 10) multiple axes by being configured to displace in multiple degrees of freedom, thus facilitating displacement of the payload mount system 10 in multiple degrees of freedom. This is advantageous because if the shock isolator assembly were configured to only facilitate displacement of the payload mount system 10 in a single degree of freedom, such as along a vertical axis, the payload mount system 10 may still experience potentially damaging shock loads along or about other axes or in other directions that could result in damage to the payload mount system 10 and the sensor assembly, including the sensor. With respect to an aircraft as shown, in those applications in which the payload mount system 10 is not necessarily supported in a position parallel to the ground, there may be one or more lateral components of a vertical shock load (e.g., component shock loads acting along different axes than a vertical or normal axis) resulting from a landing event. Furthermore, if a center of mass of the payload mount system 10 is off balance, the payload mount system 10 may experience a rotational shock load (e.g., a shock load that induces rotation of the system 10 along one or more axes) resulting from the landing that are in addition to any axial shock loads. As such, the shock isolator assembly described herein can facilitate displacement of the payload mount system 10 in multiple degrees of freedom (up to six degrees of freedom).

Figure 2:
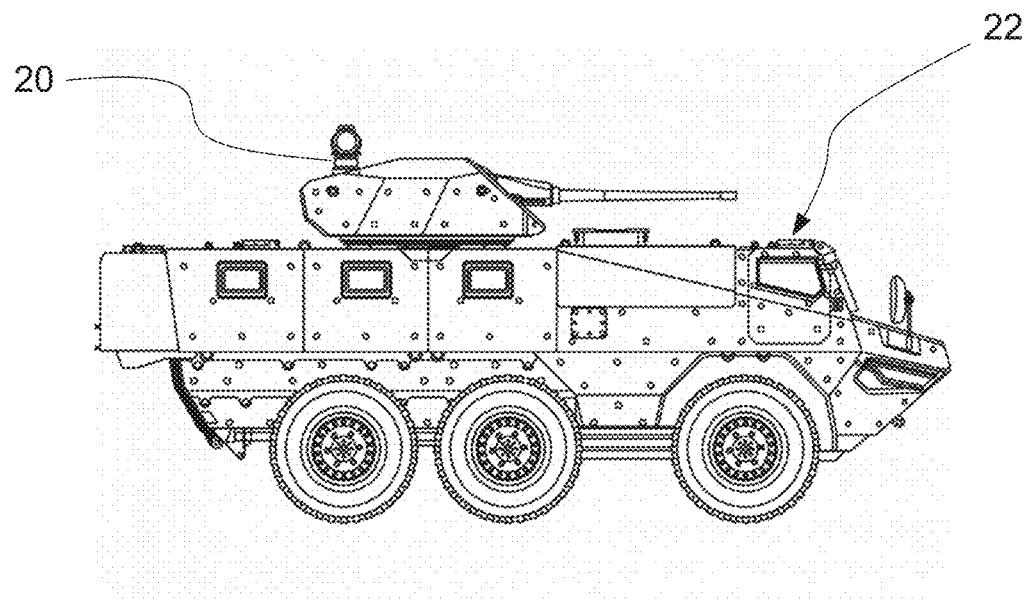
FIG. 2 illustrates a side view of a payload mount system supported on a mobile vehicle in the form of a land-based mobile vehicle.

Similarly, FIG. 2 illustrates an example payload mount system 20 rigidly coupled to the top of a land-based vehicle 22. In this example, a shock isolator assembly couples the payload mount system 20 to an upper surface of the vehicle 22. The shock isolator assembly can be configured and operable to secure the payload mount system 20, such that the payload mount system 20 behaves or performs as if rigidly mounted to the vehicle 22 during normal operating conditions (those where no shock loads are present), while further being configured to facilitate displacement of the payload mount system 20 in response to one or more shock loads. For example, if the vehicle 22 were traveling in the forward direction and the payload mount system 20 encountered an object such as a tree limb, the payload mount system 20 may be subject to a shock load that could cause the payload mount system 20 to deflect to the rear. Or, in other examples, the vehicle 22 may experience large vertical accelerations when travelling at high speeds over rough terrain. In such instances the payload mount system 20 can be configured to displace in one or more degrees of freedom relative to the land vehicle 22 in the event such operating conditions resulted in one or more shock loads acting on the payload mount system 20.

Figure 3:
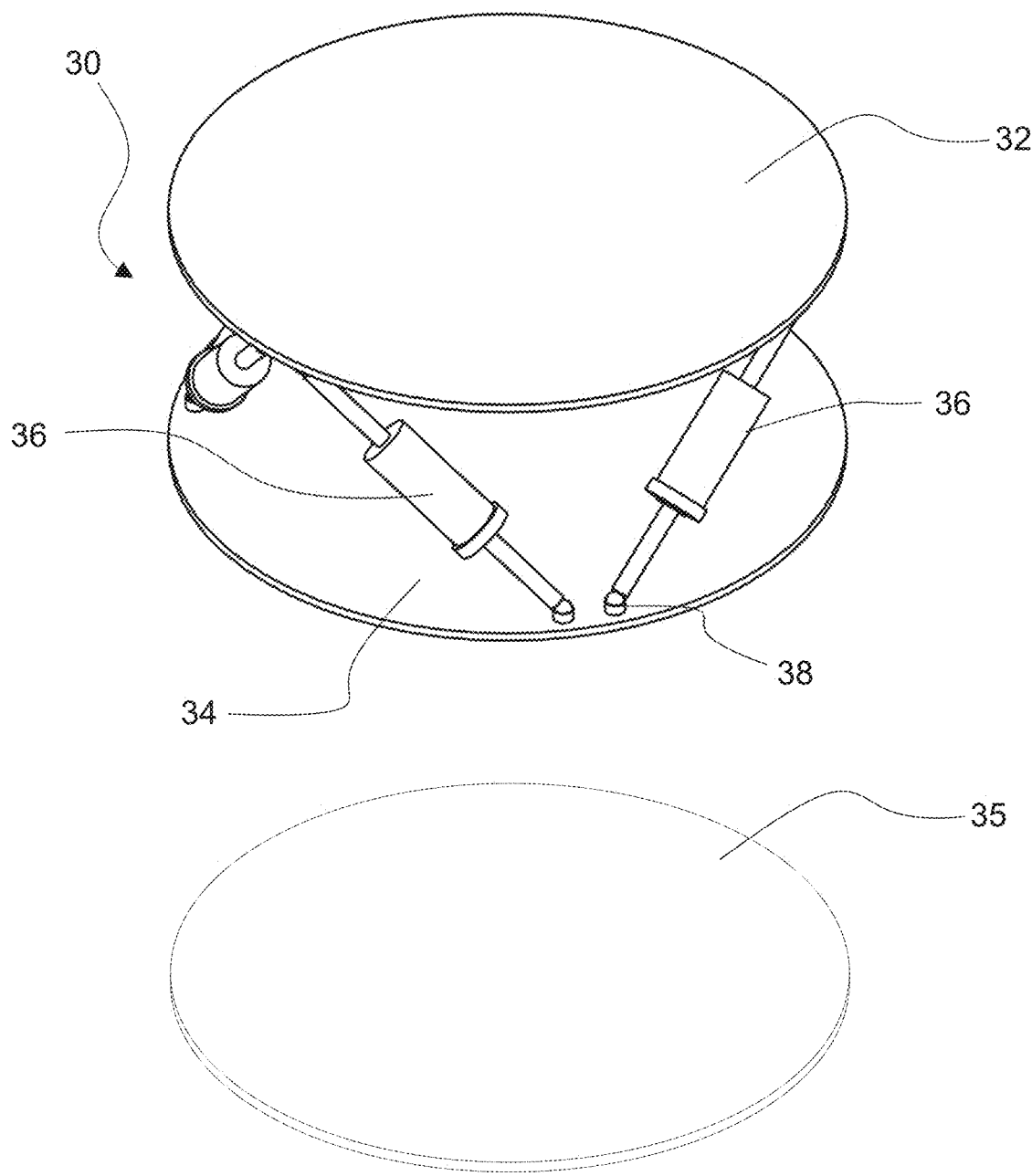
FIG. 3 illustrates a schematic view of a shock isolator assembly operable to couple a payload mount system to a mobile vehicle in accordance with an example of the present disclosure.

FIG. 3 illustrates a schematic view of an example shock isolator assembly 30 for coupling or mounting a payload mount system, for example, the payload mount system 10 of FIG. 1, or the payload mount system 20 of FIG. 2 to a vehicle, for example, the vehicle 10 in the form of an aircraft of FIG. 1 or the land-based vehicle 22 of FIG. 2. The shock isolator assembly 30 can comprise a plurality of three-stage, self-resetting buckling isolators as described below. In one example, as shown in FIG. 3, the shock isolator assembly 30 can comprise a plurality of three-stage self-resetting buckling isolators 36 (hereinafter self-resetting buckling isolators) coupling a platform 34 to a base 32 so as to spatially separate the platform 34 from the base 32 by an offset distance, which can be varied depending upon the application or as desired, Although FIG. 3 illustrates the shock isolator assembly 30 in a vertical orientation with the platform 34 above the base 32, one of ordinary skill in the art will recognize that the shock isolator assembly 30 can be oriented to suit a particular application. For example, the orientation shown in FIG. 3 is suitable for mounting on top of a vehicle, while an inversion of the orientation of the shock isolator assembly 30 shown in FIG. 3 would be suitable for mounting below a vehicle. Additionally, the shock isolator assembly 30 can be oriented to mount a payload mount system to a side of the vehicle.

In some examples, the shock isolator assembly 30 can further comprise a resilient, compliant member situated in a space or location between the platform 34 and the payload mount system 10 (see FIG. 1a). For example, the compliant member can comprise one or more elastomeric members (e.g., see elastomeric pad 35) can be placed between the platform 34 and the payload mount system 10 (see FIG. 1a). In the example shown, the shock isolator assembly 30 comprises a single elastomeric pad 35, although the shock isolator assembly 30 can comprise a plurality of such pads. The elastomeric pad 35 can dampen vibrations of the payload mount system 10 through elastic deformation. The elastomeric pad 35 can comprise an elastomeric material such as silicone, nitrile, or any other elastomeric material as will be recognized by those skilled in the art. The elastomeric pad 35 can comprise any thickness sufficient for the particular application. In one example, the elastomeric pad 35 can have a thickness of a ¼ inch. More generally, the elastomeric pad 35 can comprise a thickness between ⅛ of an inch and ½ of an inch. The elastomeric pad 35 can further comprise any elastic modulus as selected for a particular application. In one example, the elastomeric material can have an elastic modulus of 500 pounds per square inch (PSI). More generally, the elastomeric pad 35 can comprise an elastic modulus between 50 and 1500 PSI.

As indicated above, the shock isolator assembly 30 can comprise a plurality of three-stage, self-resetting buckling isolators 36 coupling a platform 34 to a base 32. The self-resetting buckling isolators 36 are each configured to "buckle," meaning they are configured to undergo a sudden change from an initial operating stage (e.g., the rigid stage) or condition to either a tension or compression stage, as represented by the dynamic displacement of the structural components making up the self-resetting buckling isolators 36 relative to one another, in response to, or when subjected to, an applied load that is greater than a predetermined threshold compression load or a threshold tension load. In addition, the self-resetting buckling isolators 36 are each configured to automatically reset, meaning they are configured to automatically return to the initial, rigid stage from each of the compression and tension stages upon the applied load dropping below the threshold tension or compression load, whichever was type acting on the isolator(s).

The self-resetting buckling isolators 36 can each be rotatably and pivotally coupled to the base 32 by respective joints (e.g., see joint 38) that allow or facilitate at least partial rotation (pivoting or articulation) of each self-resetting buckling isolator 36 relative to the base 32 about respective fixed coupling points or locations in at least two degrees of freedom (e.g., pivoting or articulating about the fixed coupling point or location about two axes (e.g., x and y axes)). In some cases, the joints can be configured to facilitate at least partial rotation in all three rotational degrees of freedom (rotation/pivoting/articulating about the x, y axes, and spin or roll about the z axis, with the z axis being parallel (e.g., coaxial) with a longitudinal axis of the self-resetting buckling isolators). Likewise, the self-resetting buckling isolators 36 can each be rotatably and pivotally coupled to the platform 34 using similar respective joints that allow or facilitate at least partial rotation (pivoting or articulation) of each self-resetting buckling isolator 36 relative to the platform 34 about respective fixed coupling points or locations in similar degrees of freedom. The joints, while permitting pivoting and/or rotation relative to the base 32 and the platform 34, the joints can be configured to isolate or prevent translation of the self-resetting buckling isolators 36 relative to the base 32 and the platform 34 (i.e., the coupling locations of each of the various self-resetting buckling isolators 36 remains fixed relative to the base 32 and the platform 34). The joint 38 can comprise, without limitation, a mechanical articulating joint (e.g., a rod end bearing (a heim or rose joint)), a universal joint, a ball joint, or any other joint capable of facilitating rotational/pivotal coupling of the self-resetting buckling isolators 36 to the base 32 and the platform 34, as discussed herein, With the self-resetting buckling isolators 36 configured to undergo axial bi-directional displacement (e.g., compression and expansion) along their respective longitudinal axes, as discussed below, the self-resetting buckling isolators 36 effectively operate to facilitate up to six degrees of relative movement between the base 32 and the platform 34.

As will be described in greater detail below, the self-resetting buckling isolators 36 can be configured to provide a three-stage response, namely the self-resetting buckling isolators 36 can provide a rigid stage response, a compression stage response, or a tension stage response depending upon the conditions in which the shock isolator assembly 30 is in use and the loads or forces acting on the shock isolator assembly 30 at any given time. In normal use, or in other words, under normal operating conditions in which no shock loads are present, the self-resetting buckling isolators 36 can be configured to be effectively rigid (they model or behave as a rigid rod). The self-resetting buckling isolators 36 can be arranged to fix the platform 34 relative to the base 32 in six degrees of freedom when the self-resetting buckling isolators 36 are in the rigid stage, with the self-resetting buckling isolators 36 positioned and oriented as shown. For example, each self-resetting buckling isolator 36 can comprise a first end angled towards a first adjacent self-resetting buckling isolator 36, and a second end angled towards a second or different adjacent self-resetting buckling isolator 36 so as to form various triangular structural configurations of the self-resetting buckling isolators 36, as shown in FIG. 3, for securing the platform 34 to the base 32.

The self-resetting buckling isolators 36 can each be configured to displace in a bi-directional manner, and can further be configured to comprise a threshold tension load and a threshold compression load, such that in the event of a tension or compression load exceeding these thresholds, the self-resetting buckling isolators 36 operate to expand or compress, and to operate in the tension or compression stages, respectively. The threshold tension load and the threshold compression load can each be the same (i.e., can have the same magnitude) for a given self-resetting buckling isolator 36, or in some examples, these threshold loads can be different.

The compression and tension threshold loads of each individual self-resetting buckling isolator 36 can be selected to contribute to and achieve a combined compression or tension threshold load provided by the plurality of self-resetting buckling isolators 36 acting together within the shock isolator assembly 30. Because the self-resetting buckling isolators 36 can be arranged at an angle relative to one another, a combined compression or tension threshold load in a given direction may be less than the sum of each individual threshold load. For example, if the self-resetting buckling isolators 36 are installed to have a longitudinal axis oriented 30 degrees from the vertical direction, the combined compression or tension threshold load for the plurality of self-resetting buckling isolators 36 in the vertical direction would be N×cos(30)×TL, where N is the number of isolators and TL is the threshold load of a single isolator (this further assuming that an applied load is applied equally to all of the plurality of self-resetting buckling isolators 36, and in the vertical direction). The combined compression and tension threshold loads can be selected or tuned based, at least in part, on the weight of the sensor assembly and an anticipated situation in which a shock or other similar load may be experienced (optionally including some degree of variation or a factor of safety) (e.g., the anticipated shock loads that occur due to a landing event of an aircraft), such that operation or use of the shock isolator assembly 30 and the payload mount system under normal operating conditions (no shock loads present or acting upon the shock isolator assembly 30 or the payload mount system) does not generate any applied loads that exceed the combined compression or tension threshold loads of the self-resetting buckling isolators 36, thus facilitating operation of the shock isolator assembly 30 (and the plurality of self-resetting buckling isolators 36) in the rigid stage where the self-resetting buckling isolators 36 model or perform as rigid rods. For example, when the platform 34 secures and supports a sensor assembly of the payload mount system weighing five hundred pounds and the expected accelerations during typical or normal use (use where no shock or other threshold loads are being applied or experienced) are 0.5 g, the individual threshold compression loads of the plurality of self-resetting buckling isolators 36 can be selected or tuned to provide a combined threshold compression load in a vertical direction of at least 500 lbs.×0.5 g, or 250 lbs. Similarly, the individual threshold tension loads of the plurality of self-resetting buckling isolators 36 can be selected or tuned to provide a combined threshold tension load. For example, the combined threshold tension load can be 500 lbs.×1.5 g, or 750 lbs. to account for the weight of the sensor. Thus, during typical use, the self-resetting buckling isolators 36 act or model as a rigid rod, but when the vehicle accelerates to accelerations greater than those during normal operations, the self-resetting buckling isolators 36 can collapse (i.e., enter the compression stage) or expand (i.e., enter the tension stage) depending on the direction of the acceleration. In another example, for a platform securing the sensor assembly above a vehicle and having a weight of 500 lbs., the combined compression threshold load in a vertical direction can be 750 lbs. and the combined tension threshold load in a vertical direction can be 250 lbs.

When the threshold compression load or the threshold tension load is exceeded for an individual self-resetting buckling isolator 36, the self-resetting buckling isolator 36 operates in the compression stage or the tension stage, respectively. In the compression stage the self-resetting buckling isolator 36 axially compresses (i.e., compresses along its longitudinal axis) to some degree due to the applied load. Thus, the platform 34 is able to move relative to the base 32 (i.e., towards one another) when the self-resetting buckling isolator 36 is in the compression stage. Moreover, the platform 34 is able to move in up to six degrees of freedom as each of the self-resetting buckling isolators 36 in the shock isolator assembly 30 compress and operate in the compression stage. Similarly, in the tension stage the self-resetting buckling isolator 36 axially elongates or expands (i.e., elongates or expands along its longitudinal axis) to some degree due to the applied load being above the threshold tension load. Thus, the platform 34 is able to move relative to the base 32 (i.e., away from one another) when the self-resetting buckling isolator 36 is in the tension stage. Moreover, the platform 34 is able to move in up to six degrees of freedom as each of the self-resetting buckling isolators 36 in the shock isolator assembly 30 expand and operate in the tension stage. In some operating conditions, a portion of the plurality of self-resetting buckling isolators 36 can be caused to operate in the compression stage, while another portion of the plurality of self-resetting buckling isolators 36 are caused to simultaneously operate in the tension stage. For example, when the platform 34 encounters loading (e.g., a torque) sufficient to overcome the threshold loads of two or more of the self-resetting buckling isolators 36, the platform 34 can rotate relative to the base 32, causing some self-resetting buckling isolators 36 to expand and other self-resetting buckling isolators 36 to compress. As such, the shock isolator assembly 30 can be considered a dynamic mechanical system with the base 32 and the platform 34, by way of the plurality of self-resetting buckling isolators 36, operable to move relative to one another in up to six degrees of freedom in response to various loads and how they are applied.

Figure 4:
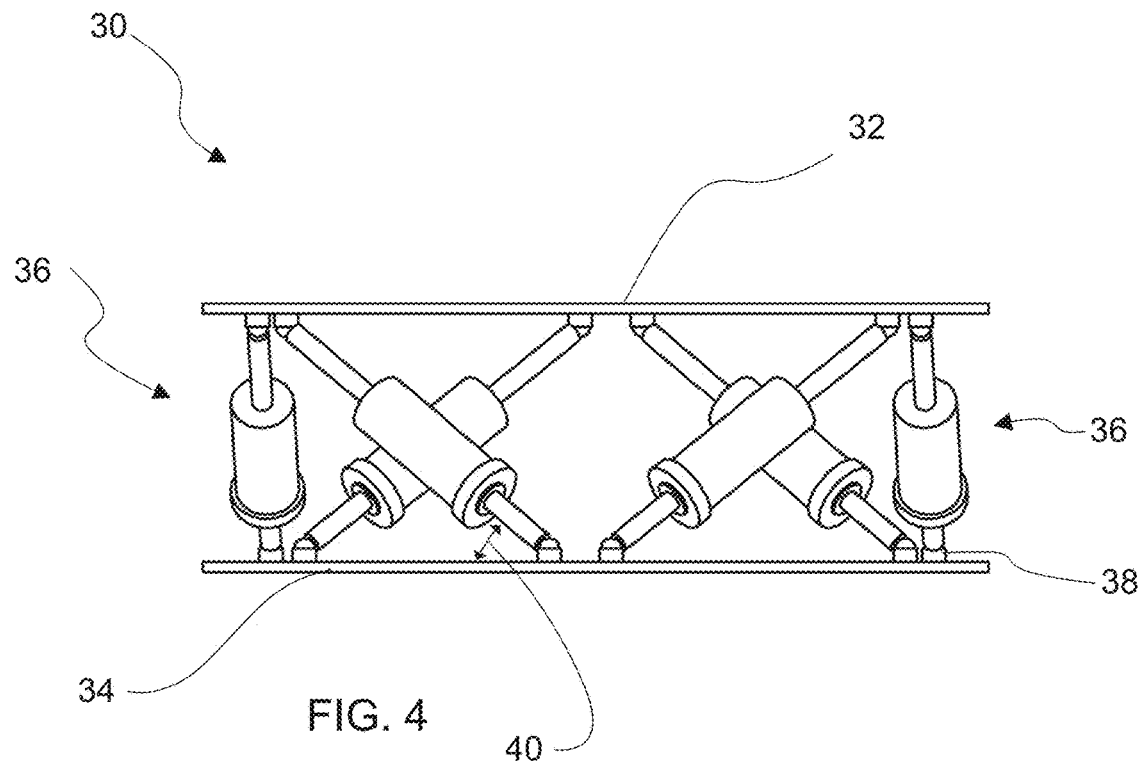
FIG. 4 illustrates a schematic view of the shock isolator assembly of FIG. 3 being displaced by a compressive dynamic force.

FIG. 4 illustrates an example of the shock isolator assembly 30 of FIG. 3 with the plurality of self-resetting buckling isolators 36 in a compression stage, such as when subjected to a compressive vertical load exceeding the threshold compression load of the self-resetting buckling isolators 36. With one or more of the self-resetting buckling isolators 36 in the compression stage, and under the applied load exceeding the threshold compression load, such self-resetting buckling isolators 36 are caused to axially shorten or compress (along their longitudinal axis) causing all or a portion of the platform 34 to move towards the base 32. As the platform 34 displaces towards the base 32, the included angle (represented by angle 40) of the longitudinal axis of one or more of the self-resetting buckling isolators 36 relative to the base 32 decreases as compared to the same angle with the shock isolator assembly 30 in the rigid stage. When the compression load is reduced to be below the combined threshold compression load or removed altogether, the self-resetting buckling isolators are caused permitted to axially expand, and the platform 34 is caused to move away from the base 32 back to the original configuration shown in FIG. 3. Stated differently, in response to the removal or the reduction of the applied compression load, such that it is below the threshold compression load, the shock isolator assembly 30 transitions from the compression stage to the rigid stage, which can be considered the position of the shock isolator assembly 30 in its normal or otherwise preset 'zero' condition (i.e., null or default position).

Figure 5:
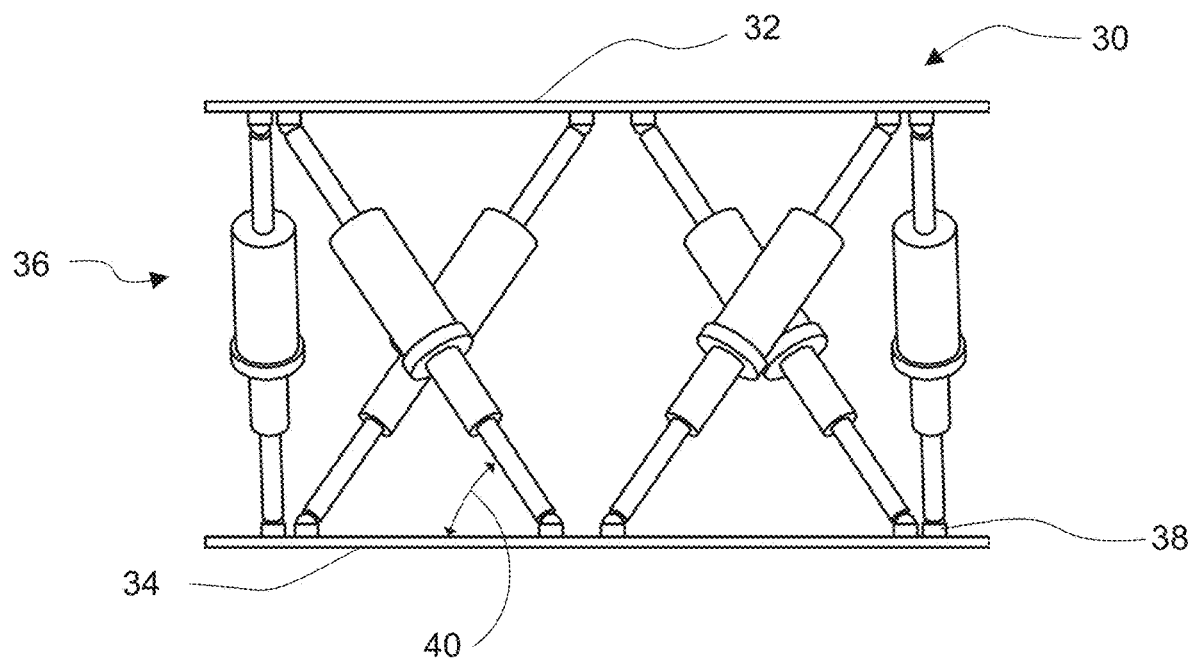
FIG. 5 illustrates a schematic view of the shock isolator assembly of FIG. 3 being displaced by a tension dynamic force.

FIG. 5 illustrates an example of the shock isolator assembly 30 of FIG. 3 with the plurality of self-resetting buckling isolators 36 in a tension stage, such as when subjected to a vertical tension load exceeding the combined threshold tension load of the self-resetting buckling isolators 36. With one or more of the self-resetting buckling isolators 36 in the tension stage, and under the applied load exceeding the threshold tension load, such self-resetting buckling isolators 36 are caused to axially lengthen or expand, causing all or a portion of the platform 34 to move away from the base 32. As the platform 34 displaces away from the base 32, the included angle (again, see angle 40) of the longitudinal axis of one or more of the self-resetting buckling isolators 36 relative to the base 32 increases as compared to the same angle with the shock isolator assembly 30 in the rigid stage. When the tension load is reduced to be below the combined threshold tension load, or removed altogether, the platform 34 is caused to move back towards the base 32 and back to the original configuration shown in FIG. 3. Stated differently, in response to the removal or the reduction of the applied tension load, such that it is below the threshold tension load, the shock isolator assembly 30 transitions from the tension stage to the rigid stage.

Figure 6:
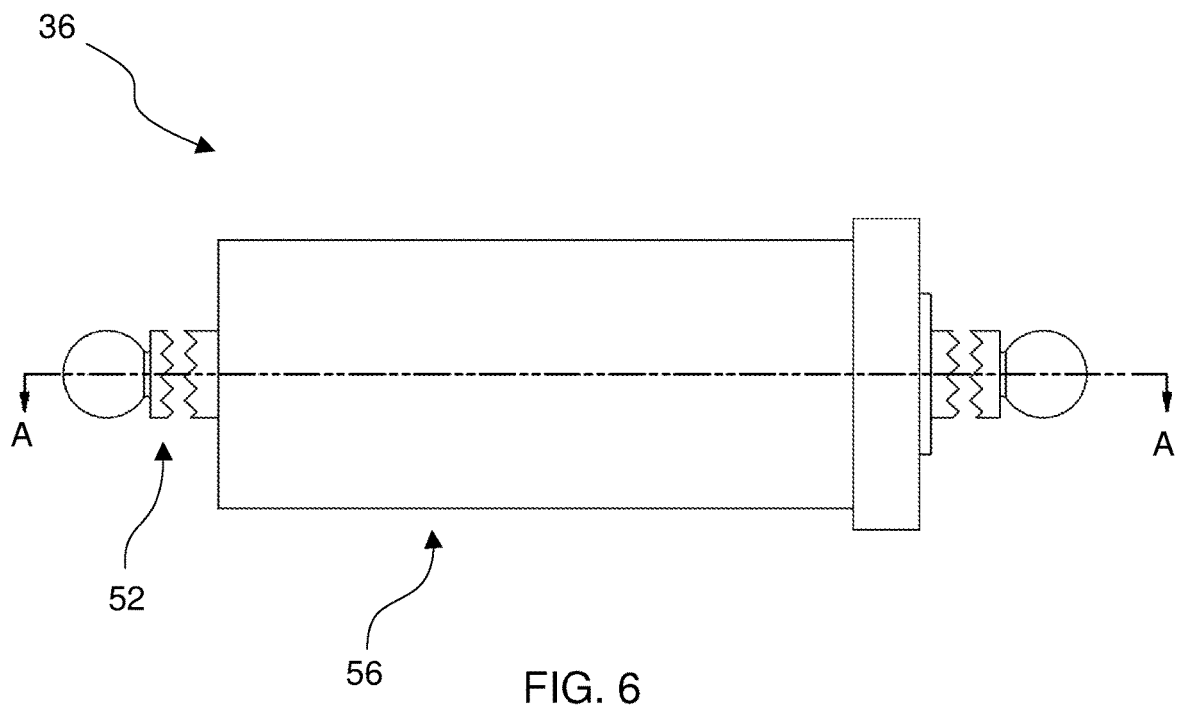
FIG. 6 illustrates a partial side view of a three-stage self-resetting buckling isolator of the shock isolator assembly of FIG. 3, with the self-resetting buckling isolator being shown in a rigid stage.

FIG. 6 illustrates a side-view of an example self-resetting buckling isolator 36 of the plurality of self-resetting buckling isolators of the shock isolator assembly 30 discussed above. As shown, the self-resetting buckling isolator 36 can comprise a first end 52, a second end 54, and a preloaded coupler 56. The first end 52 can be rotatably or pivotally coupled to one of a base or a platform (e.g., the base 32 or platform 34 of the shock isolator assembly 30 discussed above, and shown in FIG. 3) by way of a first joint (not shown) such as, without limitation, a heim joint, universal joint, or ball joint. The second end 54 can be rotatably or pivotally coupled to the other of the base or the platform by way of a second joint (not shown) such as, without limitation, a heim joint, universal joint, or ball joint. The preloaded coupler 56 couples to or is otherwise supported between the first end 52 and the second end 54 and facilitates relative axial movement of the self-resetting buckling isolator 36 along a longitudinal axis 58 (see FIG. 7) between the first end 52 and the second end 54. Thus, the preloaded coupler 56 facilitates the self-resetting buckling isolator 36 shortening its axial length in compression and elongating its axial length in tension. The preloaded coupler 56 can further be configured to generally restrict movement between the first and second ends 52, 54 in directions other than the axial direction. For example, the self-resetting buckling isolator 36 is configured to restrain movement of the first end 52 relative to the second end 54 in a lateral direction.

Figure 7:
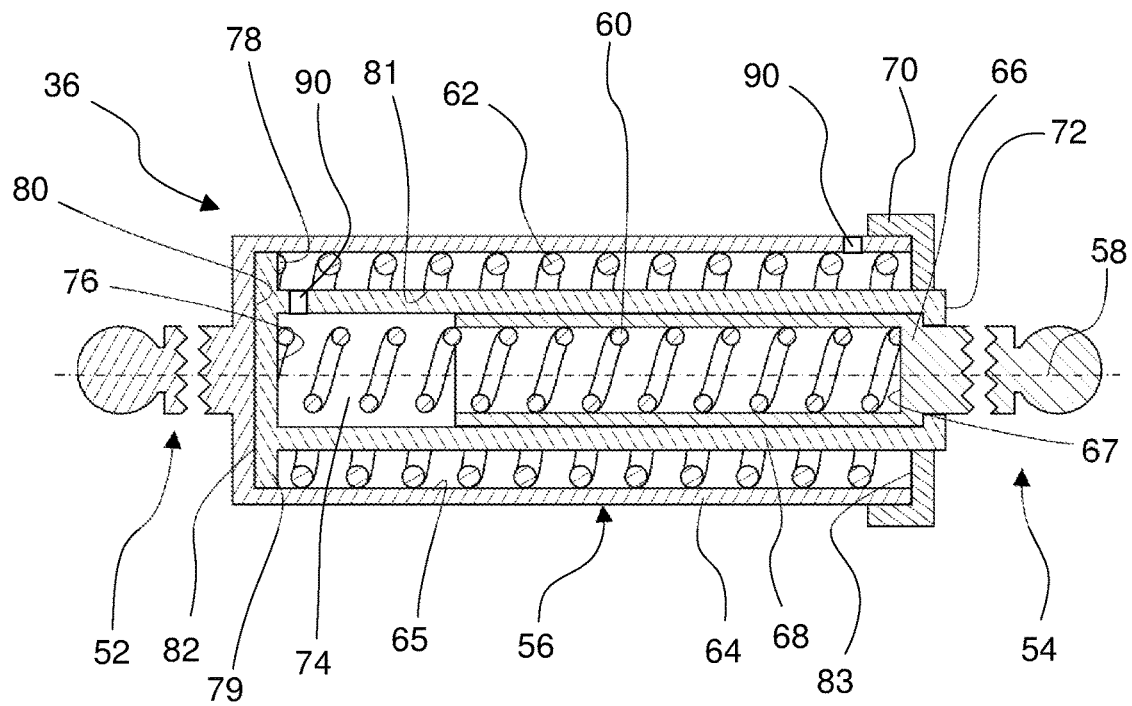
FIG. 7 illustrates a cross-sectional view of the three-stage self-resetting buckling isolator of FIG. 6 taken about line AA.

FIG. 7 is a cross-sectional view of the self-resetting buckling isolator 36 of FIG. 6. The preloaded coupler 56 can comprise a first preloaded bias spring 60 that biases (i.e., applies a directional spring force to) the first end 52 away from the second end 54 in an axial direction, and a second preloaded bias spring 62 that biases the first end 52 towards the second end 54 in an axial direction. The first preloaded bias spring 60 can comprise a first preload that provides and defines a threshold compression load of the self-resetting buckling isolator 36, and the second preloaded bias spring 62 can comprise a second preload that provides and defines a threshold tension load of the self-resetting buckling isolator 36. The first and second preload amounts of the first preloaded bias spring 60 and the second preloaded bias spring 62, respectively, can be determined by an amount of pre-compression of each spring as supported within the self-resetting buckling isolator 36 in a null or default state (i.e., without being subjected to outside loads or forces acting on the self-resetting buckling isolator 36 that cause the self-resetting buckling isolator 36 to compress or expand). For example, for a spring with a spring constant k of 100 lbs./inch the spring can be compressed one inch to provide 100 lbs, of preload. The first preloaded bias spring 60 and the second preloaded bias spring 62 can each be maintained in a preloaded condition within the preloaded coupler 56, such that they are partially compressed and do not compress further until the respective first or second preload is overcome by an external load greater than the predetermined threshold compression or tension loads. The first and second preloads can be adjusted or varied, and the self-resetting buckling isolator 36 tuned, by using one or more springs having a different spring constant, or by pre-loading (i.e., compressing) the springs a different degree or amount.

The preloaded coupler 56 can comprise a first socket 64 coupled to or otherwise operable with the first end 52, a second socket 66 coupled to or otherwise operable with the second end 54, a floating socket 68 supported between the first socket 64 and the second socket 66, with the floating socket 68 supported substantially within the first socket 64, and housing the second socket 66, as shown. The floating socket 68 is slidably supported within and relative to the first socket 64. Likewise, the second socket 66 is slidably supported within and relative to the floating socket 68. The preloaded coupler 56 can further comprise a cap 70 enclosing the space or gap between the interior surface of the first socket 64 and the outer surface of the floating socket 68. The cap 70 further operates to secure the floating socket 68 within the first socket 64, and an inner ledge 72 of the floating socket 68 operates to secure the second socket 66 within the floating socket 68. Vents 90 can be formed in the first socket 64 and the floating socket 68 to allow a fluid (e.g., air, gas, liquid) to move between the interior of the first socket 64, the second socket 66, and the floating socket 68.

The first preloaded bias spring 60 can be compressed and supported within a space 74 formed between and defined by an inner face 76 of the floating socket 68 and an inner surface 67 of the second socket 66. Indeed, a first end of the first preloaded bias spring 60 can be seated against the inner face 76 of the floating socket 68, with the opposite second end extending into the well of the second socket 66 and seated against the inner surface 67 of the second socket 66. The compression of the first preloaded bias spring 60 provides and defines the preload corresponding to the threshold compression load. An axial external force acting on the self-resetting buckling isolator 36 less than the first preload (i.e., less than the threshold compression load) is unable to compress the spring further, wherein the floating socket 68 and the second socket 66 act as a rigid body (i.e., the self-resetting buckling isolator 36 models a rigid rod). When an external axial compressive force acting on the self-resetting buckling isolator 36 is greater than the first preload (i.e., greater than the threshold compression load), the first preloaded bias spring 60 compresses further allowing the second end 54 of the self-resetting buckling isolator 36 to move towards the first end 52 of the self-resetting buckling isolator 36 as the second socket 66 slides axially within and relative to the floating socket 68. The range of travel between the second socket 66 and the floating socket 68 is defined and limited by the open end of the second socket 66 as it comes in contact with the inner face 76 of the floating socket 68. An external axial tension load does not affect the relationship between the floating socket 68 and the second socket 66, as the second socket 66 is in contact with and stopped by the inner ledge 72 of the floating socket 68 and is unable to move past the inner ledge 72.

The floating socket 68 can comprise an outer ledge 78 formed about a lateral surface 81 of the floating socket 68, and extending away from the lateral surface 81 about an end of the floating socket 68. The outer ledge 78 can comprise an outer surface 79 that complements (i.e., has a slightly less diameter than, but otherwise interfaces with) an inner surface 65 of the first socket 64. Thus, contact between the outer ledge 78 and the inner surface 65 of the first socket 64 inhibits the floating socket 68 from lateral movement relative to the first socket 64, while facilitating relative sliding between the floating socket 68 and the first socket 64. The cap 70 can comprise an inner surface 83 that is perpendicular to the axis 58 and that faces the outer ledge 78. The first socket 64 can comprise an inner face 80 oriented in a plane perpendicular to the axis 58. The floating socket 68 can comprise an outer face 82 also oriented in a plane perpendicular to the axis 58 and that faces and seats against the inner face 80 of the first socket 64. Contact between the inner face 80 and the outer face 82 prevents the floating socket 68 from moving further inward in the first socket 64. The second preloaded bias spring 62 is compressed between the inner surface 83 of the cap 70 and the outer ledge 78 of the floating socket 68 to define the second preload (i.e., the threshold tension load). The second preload of the second preloaded bias spring 62 determines the threshold tension load. The second preloaded bias spring 62 biases the floating socket 68 away from the cap 70. Due to the preload of the second preloaded bias spring 62, the floating socket 68 is unable to move towards the cap 70 and the floating socket 68 and the first socket 64 act as a rigid body (i.e., the self-resetting buckling isolator models a rigid body) until an axial external tension force overcomes the second preload. When an external axial tension force acting on the self-resetting buckling isolator 36 is greater than the second preload (i.e., greater than the threshold tension load), the second preloaded bias spring 62 compresses further allowing the second end 54 of the self-resetting buckling isolator 36 to move away the first end 52 of the self-resetting buckling isolator 36 as the floating socket 68 slides axially within and relative to the first socket 64. An external axial compression load does not affect the relationship between the floating socket 68 and the first socket 64, as the outer face 82 of the floating socket 68 is in contact with and stopped by the inner face 80 of the first socket 64 and is unable to move past the inner face 80.

The self-resetting buckling isolator 36 is effectively rigid when the external forces (i.e., those induced by operation of the vehicle or other structure supporting the payload mount system and the shock isolator assembly) acting on it are less than the threshold tension load and the threshold compression load. The preload of the first preloaded bias spring 60 biases the first and second ends 52, 54 away from one another, and the preload of the second preloaded bias spring 62 biases the first and second ends 52, 54 towards one another. An external tension load does not affect and cause further compression of the first preloaded bias spring 60 since the inner ledge 72 of the floating socket 68 is in contact with the second socket 66, and the sliding of the floating socket 68 relative to the first socket 64 does not cause relative sliding between the second socket 66 and the floating socket 68. Similarly, a compression load does not affect and cause further compression of the second preloaded bias spring 62 since the floating socket 68 is in contact with the first socket 64, and the sliding of the second socket 66 relative to the floating socket 68 does not cause relative sliding between the second socket 66 and the floating socket 68. Thus, the self-resetting buckling isolator 36 is configured, such that the first and second preloaded bias springs 60, 62 are able to operate independent of one another, and to provide the self-resetting buckling isolator 36 with two dynamic stages of operation that model a spring, or that provide spring-like behavior, namely the tension and compression stages.

Figure 8:
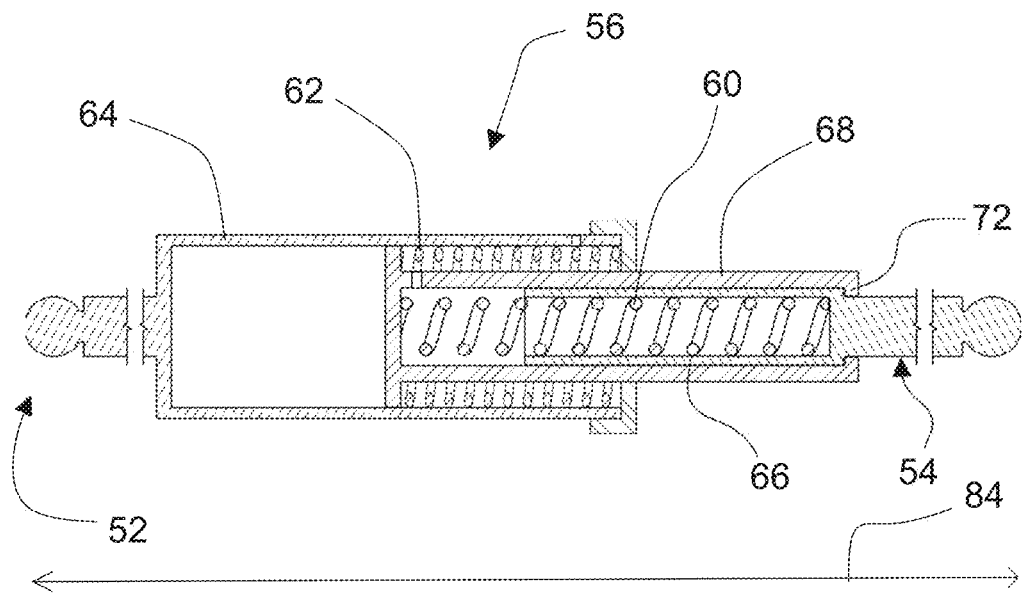
FIG. 8 illustrates a cross-sectional side view of the three-stage self-resetting buckling isolator of FIG. 3, with the self-resetting buckling isolator being shown in a tension stage.

FIG. 8 illustrates a cross-section of the preloaded coupler 56 of the self-resetting buckling isolator 36 (see FIG. 6) with the self-resetting buckling isolator 36 in the tension stage. As can be seen, in the tension stage a tension load, indicated by line 84, acting on the preloaded coupler 56, is sufficient to overcome the preload and threshold tension load (i.e., exceeds the predetermined and designed threshold tension load) of the second preloaded bias spring 62, as well as any friction between the first socket 64 and the floating socket 68, which is likely minimal or negligible. Under the applied tension load, the second preloaded bias spring 62 is caused to compress, thus causing the first socket 64 and the floating socket 68 to displace relative to one another, and for the first and second ends 52 and 54 of the self-resetting buckling isolator 36 to move away from one another. In other words, the self-resetting buckling isolator 36 is caused to elongate or lengthen under the applied tension load, which exceeds the threshold tension load. At the same time, the second socket 66 maintains its position within and relative to the floating socket 68 (i.e., the first preloaded bias spring 60 does not compress, or is not caused to compress, and maintains its original length) as the second socket 66 contacts and is seated against the inner ledge 72 of the floating socket 68. In addition, it is through this seated contact between the second socket 66 and the floating socket 68 that facilitates a transfer of forces from the second socket 66 to the floating socket 68 and the relative displacement between the floating socket 68 and the first socket 64. Indeed, as the second socket 66 is coupled to one of the base or the platform of the shock isolator assembly (see FIG. 3) at the second end 54, and as the second socket 66 is seated against the inner ledge 72 of the floating socket 68, any tension force acting on the second socket 66 from movement between the base and the platform of the shock isolator assembly that exceeds the threshold tension load of the self-resetting buckling isolator 36, will result in a transfer of force from the second socket 66 to the floating socket 68, which will in turn, result in displacement of the floating socket 68 relative to the first socket 64. The tension stage can accommodate and account for a range of applied tension loads in excess of the threshold tension load due to the configuration of the preloaded coupler 56. In some examples, the range or travel, or the displacement distance permitted between the first socket 64 and the floating socket 68 can be limited by the second preloaded bias spring 62 bottoming out (i.e., reaching a fully compressed state), or by one or more stops protruding from the inner surface 65 of the first socket 64 that prevent the second preloaded bias spring 62 from bottoming out.

Upon a reduction in the applied tension load, or removal of this load altogether, the first socket 64 and the floating socket 68 can be caused to displace in the opposing direction until the self-resetting buckling isolator 36 and the preloaded coupler 56 transitions from the tension stage back to the rigid stage. In other words, the self-resetting buckling isolator 36 is configured to reset, meaning it is configured to return from the compression stage or the tension stage to the rigid stage upon the applied load being reduced below the threshold compression load or the threshold tension load, respectively.

Figure 9:
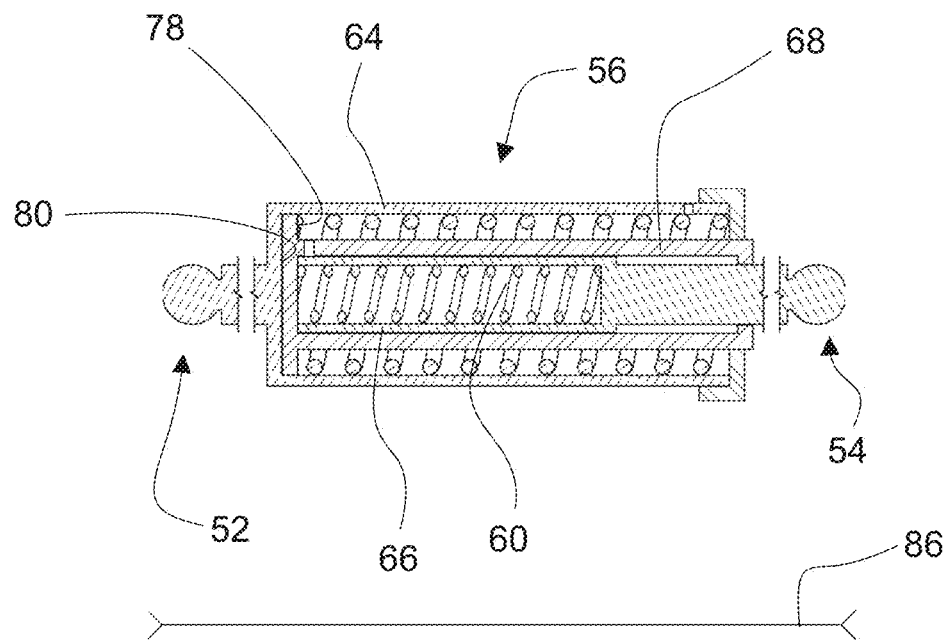
FIG. 9 illustrates a cross-sectional side view of the three-stage self-resetting buckling isolator of FIG. 3, with the self-resetting buckling isolator being shown in a compression stage.

FIG. 9 illustrates the preloaded coupler 56 of the self-resetting buckling isolator 36 (see FIGS. 6, 7, and 8) with the self-resetting buckling isolator 36 in a compression stage. As can be seen, in the compression stage a compression load, indicated by line 86, acting on the preloaded coupler 56, is sufficient to overcome the preload and threshold compression load (i.e., exceeds the predetermined and designed threshold compression load) of the first preloaded bias spring 60, as well as any friction between the second socket 66 and the floating socket 68, which is likely to be minimal. Under the applied compression load, the first preloaded bias spring 60 is caused to compress, thus causing the second socket 66 and the floating socket 68 to displace relative to one another, and for the first and second ends 52 and 54 of the self-resetting buckling isolator 36 to move towards one another. In other words, the self-resetting buckling isolator 36 is caused to compress or shorten under the applied compression load, which exceeds the threshold compression load. At the same time, the floating socket 68 maintains its position within and relative to the first socket 64 (i.e., the second preloaded bias spring 62 does not compress, or is not caused to compress, and maintains its original length) as the floating socket 68 contacts and is seated against the inner face 80 of the first socket 64. In addition, it is through this seated contact between the floating socket 68 and first socket 64 that facilitates a transfer of forces from the first socket 64 to the floating socket 68 and the relative displacement between the floating socket 68 and the second socket 66. Indeed, as the first socket 64 is coupled to one of the base or the platform of the shock isolator assembly (see FIG. 3) at the first end 52, and as the floating socket 68 is seated against the inner face 80 of the first socket, any compression force acting on the first socket 64 from movement between the base and the platform of the shock isolator assembly that exceeds the threshold compression load of the self-resetting buckling isolator 36, will result in a transfer of force from the first socket 64 to the floating socket 68, which will in turn, result in displacement of the second socket 66 relative to the floating socket 68. The compression stage can accommodate and account for a range of applied compression loads in excess of the threshold compression load due to the configuration of the preloaded coupler 56. In some examples, the range or travel, or the displacement distance permitted between the second socket 66 and the floating socket 68 can be limited by the first preloaded bias spring 60 bottoming out (i.e., reaching a fully compressed state), or by contact of the second socket 66 with the floating socket 68.

Figure 10:
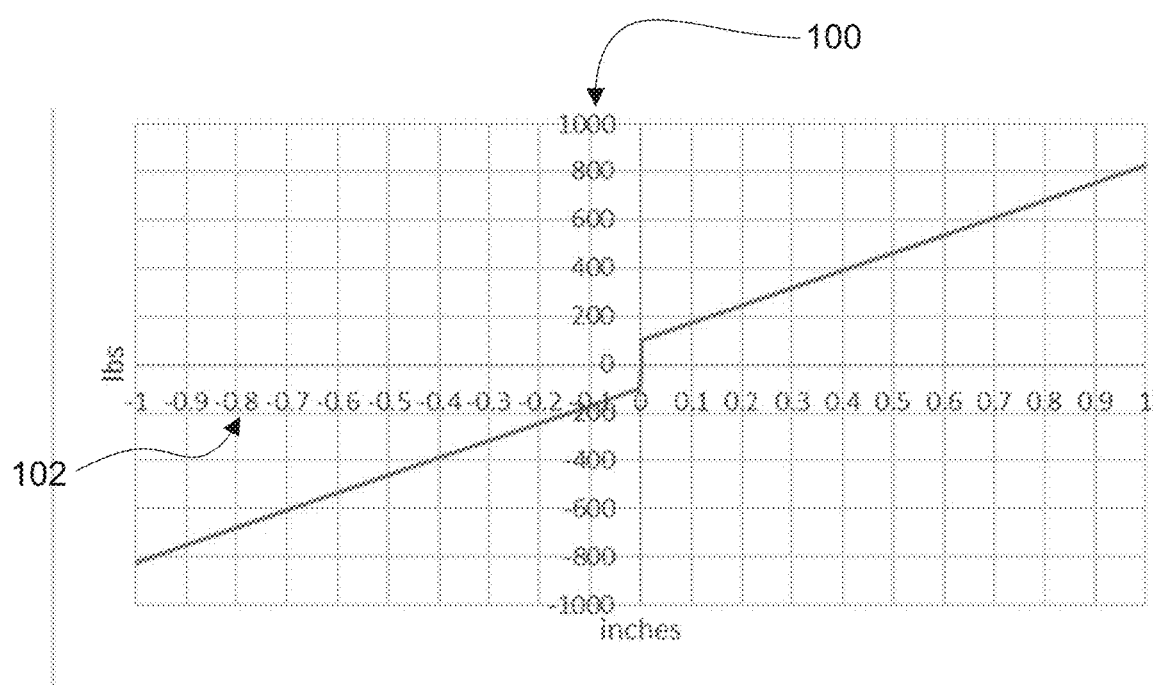
FIG. 10 illustrates a load-displacement graph for the three-stage self-resetting buckling isolator of FIG. 3.

FIG. 10 is a displacement graph illustrating the relationship between an axial load (e.g., see magnitude of axial load measured in lbs. represented at 100) applied to a self-resetting buckling isolator and the relative displacement distance (e.g., see displacement distance as measured in inches represented by 102) between the first and second ends (or within the preloaded coupler) of the self-resetting buckling isolator. In this example, the threshold compression load and the threshold tension load are each 100 lbs., and the rigid stage is characterized by a vertical line at the origin (from −100 lbs. to 100 lbs., with no displacement in either tension or compression). At axial loads less than 100 lbs. in tension or compression, the first and second ends are not displaced relative to one another.

At compression loads above 100 lbs., the threshold compression load is overcome and the first and second ends displace and move relative to one another, as shown by the upward sloped portion of the graph from 0 to 1.0 inches. Thus, when experiencing a compressive load greater than the threshold compression load, the self-resetting buckling isolator acts as a spring, compressing further as the load increases. It is noted, and one skilled in the art will recognize, that the first and second ends of the self-resetting buckling isolator can move bi-directionally relative to one another within this compression stage (i.e., the applied compression load can vary within the compression stage), as long as the applied compression load remains above the threshold compression load.

Similarly, at tension loads above 100 lbs., the threshold tension load is overcome and the first and second ends displace and move relative to one another, as shown by the downward sloped portion of the graph from 0 to −1.0 inches. Thus, when experiencing a tension load greater than the threshold tension load, the self-resetting buckling isolator acts as a spring, elongating further as the load increases. It is noted, and one skilled in the art will recognize, that the first and second ends of the self-resetting buckling isolator can move bi-directionally relative to one another within this tension stage (i.e., the applied tension load can vary within the tension stage), as long as the applied tension load remains above the threshold tension load.

Figure 11:
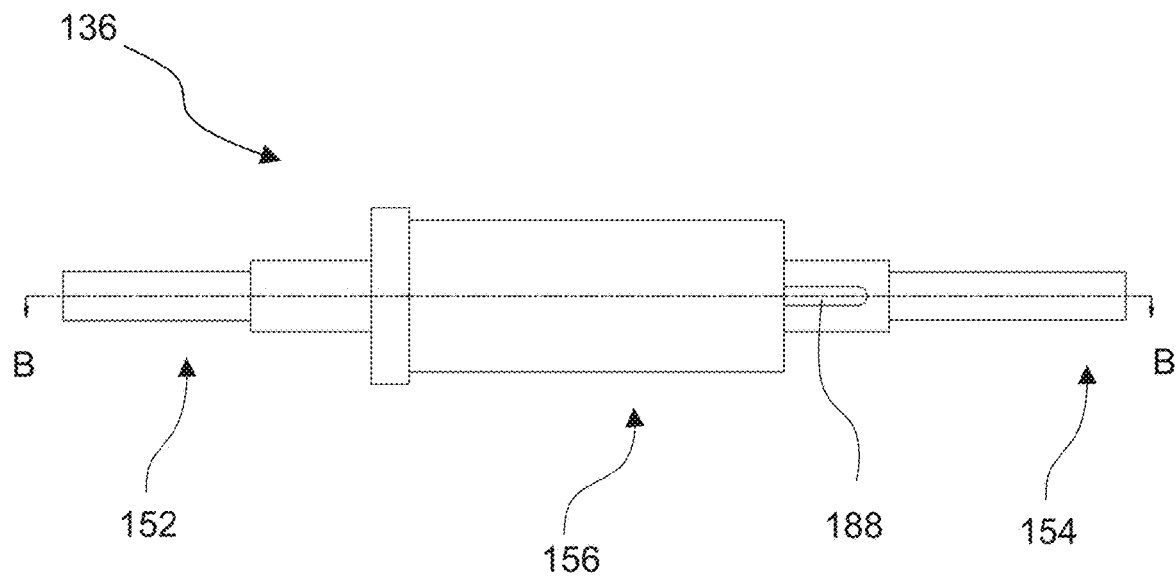
FIG. 11 illustrates a partial side view of a three-stage self-resetting buckling isolator, with the self-resetting buckling isolator being shown in a rigid stage.

FIG. 11 illustrates a side-view of another example three-stage, self-resetting buckling isolator 136 that can be used in the shock isolator assembly 30 discussed above. It is noted that the self-resetting buckling isolator 136 can function in three stages similar to the buckling isolator 36 discussed above, although the self-resetting buckling isolator 136 is configured differently, or comprises a different configuration, than the self-resetting buckling isolator 36. As such, the discussion above regarding the three stages is incorporated here, where applicable and as will be recognized by those skilled in the art. In this example, as shown, the self-resetting buckling isolator 136 can comprise a first end 152, a second end 154, and a preloaded coupler 156. The first end 152 can be rotatably or pivotally coupled to one of a base or a platform (e.g., the base 32 or platform 34 of the shock isolator assembly 30 discussed above, and shown in FIG. 3) by way of a first joint (not shown) such as, without limitation, a heim joint, universal joint, a ball joint, or any other type of joint as will be apparent to those skilled in the art. The second end 154 can be rotatably or pivotally coupled to the other of the base or the platform by way of a second joint (not shown) similar to the first joint. The preloaded coupler 156 couples to or is otherwise supported between the first end 152 and the second end 154 and facilitates relative axial movement of the self-resetting buckling isolator 136 along a longitudinal axis 158 (see FIG. 12) between the first end 152 and the second end 154. Thus, the preloaded coupler 156 facilitates the self-resetting buckling isolator 136 shortening its axial length in compression and elongating its axial length in tension. The preloaded coupler 156 can further be configured to generally restrict movement between the first and second ends 152, 154 in directions other than the axial direction. For example, the self-resetting buckling isolator 136 is configured to restrain movement of the first end 152 relative to the second end 154 in a lateral direction.

Figure 12:
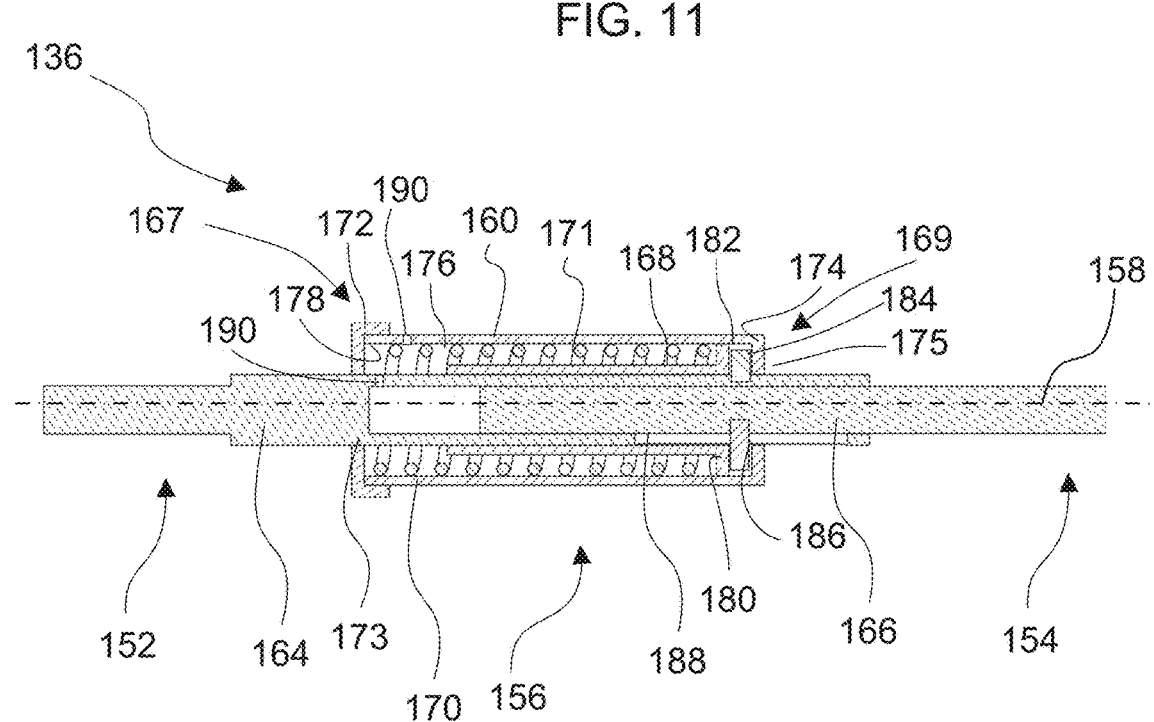
FIG. 12 illustrates a cross-sectional view of the three-stage self-resetting buckling isolator of FIG. 11 taken about line BB.

FIG. 12 is a cross-sectional view of the self-resetting buckling isolator 136 of FIG. 11. The preloaded coupler 156 can comprise a preloaded bias spring 160 that biases (i.e., applies a directional spring force to) the first end 152 away from the second end 154 in an axial direction and the first end 152 towards the second end 154 in the axial direction. The preloaded bias spring 160 can comprise a preload that provides and defines a threshold compression load of the self-resetting buckling isolator 136 and a threshold tension load of the self-resetting buckling isolator 136. The preload amount of the preloaded bias spring 160 can be determined by an amount of pre-compression of the spring as supported within the self-resetting buckling isolator 136 in a null or default state (i.e., without being subjected to outside loads or forces acting on the self-resetting buckling isolator 136 that cause the self-resetting buckling isolator 136 to compress or expand). For example, for a spring with a spring constant k of 100 lbs./inch the spring can be compressed one inch to provide 100 lbs. of preload. The preloaded bias spring 160 can be maintained in a preloaded condition within the preloaded coupler 156, such that it is partially compressed and does not compress further until the preload is overcome by an external load greater than the predetermined threshold compression or tension loads. The preload can be adjusted or varied, and the self-resetting buckling isolator 136 tuned, by using a spring having a different spring constant, or by pre-loading (i.e., compressing) the spring to a different degree or amount.

The preloaded coupler 156 can comprise a floating socket 170 having an internal cavity 171 with a first end 167 having a first aperture 173 and a second end 169 having a second aperture 175, a fixed socket 164 coupled to or otherwise operable with the first end 152 and extending through the first aperture 173, a shaft 166 coupled to or otherwise operable with the second end 154 and extending through the second aperture 175, and a floating sleeve 168 located within the internal cavity 171 and supported by the fixed socket 164. The floating socket 170 can further comprise a cap 172 enclosing the internal cavity 171 and comprising the first aperture 173. The cap 172 further operates to secure the preloaded bias spring 160 within the floating socket 170. Vents 190 can be formed in the first socket 164 and the floating socket 168 to allow a fluid (e.g., air, gas, liquid) to move between the interior of the first socket 164, the second socket 166, and the floating socket 168.

The floating sleeve 168 can have a radial protrusion 182 that extends outward to the floating socket 170. The fixed socket 164 can have a radial extension, such as first pin 184, that extends radially outward from the fixed socket 164 towards the floating socket 170. The first pin 184 can be secured to the fixed socket 164 using conventional means such as a threaded connection or a press fit within a socket of the fixed socket 164. The shaft 166 can have a second pin 186 that extends radially outward from the shaft 166 towards the floating socket 170. The second pin 186 can be secured to the shaft 166 using conventional means such as a threaded connection or a press fit within a socket of the shaft 166. The fixed socket 164 can have a longitudinal slot 188 and the second pin 186 can extend through the longitudinal slot 188 of the fixed socket 164. Thus, the shaft 166 and the fixed socket 164 can slide axially relative to one another with the second pin 186 located in the longitudinal slot 188. The first pin 184 and the second pin 186 can be located between the radial protrusion 182 of the floating sleeve 168 and an end face 174 of the floating socket 170.

The floating sleeve 168 can have an internal diameter that is slightly greater than an external diameter of the fixed socket 164 to provide a gap between the floating sleeve 168 and the fixed socket 164 to allow for axial tilt between the floating sleeve 168 and the fixed socket 164. The amount of axial tilt can be varied by adjusting the length of the floating sleeve 168 and the size of the gap. The axial tilt can reduce backlash in the preloaded coupler 156 that may otherwise occur due to small differences in the diameters of the pins 184, 186.

The preloaded bias spring 160 can be compressed and supported within a space 176 formed between and defined by an inner face 178 of the floating socket 170 and an inner face 180 of the radial protrusion 182 of the floating sleeve 168. Indeed, a first end of the preloaded bias spring 160 can be seated against the inner face 178 of the floating socket 170, with the opposite second end seated against the inner face 180 of the radial protrusion 182. Thus, the preloaded bias spring 160 biases the inner face 180 of the floating sleeve 168 away from the inner face 178 of the floating socket 170. The compression of the preloaded bias spring 160 provides and defines the preload corresponding to the threshold compression load and the threshold tension load. An axial external force acting on the self-resetting buckling isolator 136 less than the preload is unable to compress the preloaded bias spring 160 further, wherein the fixed socket 164 and the shaft 166 act as a rigid body (i.e., the self-resetting buckling isolator 136 is in a rigid stage and models a rigid rod).

An external axial compressive force acting on the self-resetting buckling isolator 136 causes the first pin 184 to press against the end face 174 of the floating socket 170 and the second pin 186 to press against the radial protrusion 182 of the floating sleeve 168 in an opposite direction causing a compressive force on the preloaded bias spring 160. The preload of the preloaded bias spring 160 inhibits the floating sleeve 168 moving axially toward the first end of the floating socket 170.

An external tension force acting of the self-resetting buckling isolator 136 causes the first pin 184 to press against the radial protrusion 182 of the floating sleeve 168 and the second pin 186 to press against the end face 174 of the floating socket 170 in an opposite direction causing a compressive force on the preloaded bias spring 160. The preload of the preloaded bias spring 160 inhibits the floating sleeve 168 moving axially relative to the floating socket 170.

When the axial compressive or tension load is greater than the preload, the preloaded bias spring 160 compresses further allowing the floating sleeve 168 of the self-resetting buckling isolator 136 to move towards the inner face 178 of the floating socket 170. Thus, the self-resetting buckling isolator 136 is effectively rigid and in the rigid stage when the external forces (i.e., those induced by operation of the vehicle or other structure supporting the payload mount system and the shock isolator assembly) acting on it are less than the threshold tension load and the threshold compression load. The preload of the preloaded bias spring 160 biases the first and second ends 152, 154 away from one another, and the first and second ends 52, 54 towards one another at the same time. Thus, the self-resetting buckling isolator 36 is configured to provide two dynamic stages of operation that model a spring, or that provide spring-like behavior, namely the tension and compression stages.

FIG. 13 illustrates a cross section of the preloaded coupler 156 of the self-resetting buckling isolator 136 (see FIG. 11) with the self-resetting buckling isolator 136 in the tension stage. As can be seen, in the tension stage a tension load, indicated by line 190, acting on the preloaded coupler 156, is sufficient to overcome the preload of the preloaded bias spring 160, as well as any friction between the fixed socket 164 and shaft 166, which is likely minimal or negligible. Under the applied tension load, the preloaded bias spring 160 is caused to compress by the relative movement of the fixed socket 164 and the shaft 166. The first pin 184 of the fixed socket 164 presses radial protrusion 182 of the floating sleeve 168 and the second pin 186 of the shaft 166 presses end face 174 of the floating socket 170, thus allowing for the first and second ends 152 and 154 of the self-resetting buckling isolator 136 to move away from one another. In other words, the self-resetting buckling isolator 136 is caused to elongate or lengthen under the applied tension load, which exceeds the threshold tension load. The tension stage can accommodate and account for a range of applied tension loads in excess of the threshold tension load due to the configuration of the preloaded coupler 156.

Upon a reduction in the applied tension load, or removal of this load altogether, the fixed socket 164 and the shaft 166 can be caused to displace in the opposing direction until the self-resetting buckling isolator 136 and the preloaded coupler 156 transitions from the tension stage back to the rigid stage. In other words, the self-resetting buckling isolator 136 is configured to reset, meaning it is configured to return from the compression stage or the tension stage to the rigid stage upon the applied load being reduced below the threshold compression load or the threshold tension load, respectively.

FIG. 14 illustrates the preloaded coupler 156 of the self-resetting buckling isolator 136 (see FIG. 11) with the self-resetting buckling isolator 136 in the compression stage. As can be seen, in the compression stage a compression load, indicated by line 192, acting on the preloaded coupler 156, is sufficient to overcome the preload of the preloaded bias spring 160, as well as any friction between the fixed socket 164 and the shaft 166, which is likely to be minimal. Under the applied compression load, the preloaded bias spring 160 is caused to compress by the relative movement of fixed socket 164 and shaft 166. The first pin 184 of the floating sleeve 168 presses end face 174 of the floating socket 170 and the second pin 186 of the shaft 166 presses the radial protrusion 182 of the floating sleeve 168, thus allowing the fixed socket 164 and the shaft 166 to displace relative to one another, and for the first and second ends 152 and 154 of the self-resetting buckling isolator 136 to move towards one another. In other words, the self-resetting buckling isolator 136 is caused to compress or shorten under the applied compression load, which exceeds the threshold compression load. The compression stage can accommodate and account for a range of applied compression loads in excess of the threshold compression load due to the configuration of the preloaded coupler 56.

As described in FIGS. 3-14, a payload mount system employing the described shock isolator assembly (e.g., see shock isolator assembly 30) with its accompanying self-resetting buckling isolators (e.g., see buckling isolator 36 or buckling isolator 136) can behave or perform as if it were rigidly coupled to a vehicle, but displace when subjected to loads that exceed a threshold load (in compression or tension). Additionally, the individual self-resetting buckling isolators are able to reset or return to their zero or null position (the rigid stage) (wherein the shock isolator assembly can also be considered to return to the zero or null position (as well as caused to be in and comprise a compression stage and a tension stage)) once the applied load is reduced below the threshold load. For example, an aircraft experiencing a hard landing might induce a shock load exceeding a threshold compression or load (or both) of the self-resetting buckling isolators. In response, the self-resetting buckling isolators can buckle allowing the payload (e.g., the sensor assembly) to displace relative to the aircraft thereby reducing the shock load transmitted to the payload. Once the shock load has been removed, for example after the aircraft has landed, the self-resetting buckling isolators 36 can return to their original configuration returning the payload to its original position. As such, the payload is protected from shock loads that otherwise might damage the payload, or negatively affect its performance during normal operations.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A shock isolator assembly, comprising:
   a base;
   a platform;
   a plurality of self-resetting buckling isolators providing a three-stage response to an applied dynamic load acting between the base and the platform, wherein the three-stage response comprises:
     a tension stage when the dynamic load exceeds a threshold tension load;
     a compression stage when the dynamic load exceeds a threshold compression load; and
     a rigid stage when the dynamic load is below the threshold tension load and the threshold compression load; and
   an elastomeric pad supported by the platform and situated between the platform and a payload mount system supported by the platform, wherein the elastomeric pad operates to dampen vibrations of the payload mount system
wherein each of the self-resetting buckling isolators comprises:
a first end coupled to one of the base or the platform;
a second end opposing the first end and coupled to the other of the base or the platform; and
a preloaded coupler coupling the first end to the second end, the preloaded coupler facilitating relative axial movement between the first end and the second end, wherein the preloaded coupler has a preload in a first axial direction and a preload in a second axial direction opposite the first axial direction so as to inhibit relative movement in the first axial direction at loads less than the preload in the first axial direction, and to inhibit relative movement in the second axial direction at loads less than the preload in the second axial direction, and wherein the preloaded coupler comprises:
a single preloaded bias spring;
a floating socket having an internal cavity, a first end of the floating socket having a first aperture and a second end of the floating socket having a second aperture;
a fixed socket coupled to the first end of the three-stage self-resetting buckling isolator and extending through the first aperture, the fixed socket comprising a longitudinal slot and a first pin extending radially outward away from the fixed socket;
a shaft coupled to the second end of the three-stage self-resetting buckling isolator and extending through the second aperture, the shaft comprising a second pin extending radially outward from the shaft and extending through the longitudinal slot; and
a floating sleeve located within the internal cavity and located about the fixed socket, the floating sleeve slidable relative to the fixed socket and the floating socket;
wherein the single preloaded bias spring biases the floating sleeve away from the first end of the floating socket; and
wherein the first pin is located between the floating sleeve and the second end of the floating socket and is configured to cause the floating socket to move towards the first end of the floating socket in response to compression of the three-stage self-resetting buckling isolator, and the second pin is located between the floating sleeve and the second end of the floating socket and is configured to cause the floating socket to move towards the first end of the floating socket in response to elongation of the three-stage self-resetting buckling isolator.

2. The shock isolator assembly of claim 1, wherein the platform is moveable relative to the base in six degrees of freedom during the tension stage and the compression stage.

3. A three-stage self-resetting buckling isolator comprising:
a first end having an interface operable to couple to one of a platform or a base;
a second end opposing the first end and having an interface operable to couple to the other of the platform or the base; and
a preloaded coupler coupling the first end of the three-stage self-resetting buckling isolator to the second end of the three-stage self-resetting buckling isolator and facilitating relative axial movement between the first end and the second end of the three-stage self-resetting buckling isolator, the preloaded coupler comprising:
a single preloaded bias spring;
a floating socket having an internal cavity, a first end of the floating socket having a first aperture and a second end of the floating socket having a second aperture;
a fixed socket coupled to the first end of the three-stage self-resetting buckling isolator and extending through the first aperture, the fixed socket comprising a longitudinal slot and a first pin extending radially outward away from the fixed socket;
a shaft coupled to the second end of the three-stage self-resetting buckling isolator and extending through the second aperture, the shaft comprising a second pin extending radially outward from the shaft and extending through the longitudinal slot; and
a floating sleeve located within the internal cavity and located about the fixed socket, the floating sleeve slidable relative to the fixed socket and the floating socket;
wherein the single preloaded bias spring biases the floating sleeve away from the first end of the floating socket; and
wherein the first pin is located between the floating sleeve and the second end of the floating socket and is configured to cause the floating socket to move towards the first end of the floating socket in response to compression of the three-stage self-resetting buckling isolator, and the second pin is located between the floating sleeve and the second end of the floating socket and is configured to cause the floating socket to move towards the first end of the floating socket in response to elongation of the three-stage self-resetting buckling isolator;
wherein the buckling isolator comprises a rigid stage that inhibits relative movement in the axial direction when a dynamic load is less than a threshold compression load and less than a threshold tension load of the buckling isolator, a compression stage that facilitates axial compression of the buckling isolator when the dynamic load is greater than the threshold compression load of the buckling isolator, and a tension stage that facilitates axial elongation of the buckling isolator when the dynamic load is greater than the threshold tension load of the buckling isolator,
wherein the preloaded coupler biases the first and second ends away from each other in an axial direction in the compression stage and the first and second ends towards each other in an axial direction opposite the first axial direction in the tension stage, and
wherein the threshold tension load is provided by the single preloaded bias spring and the threshold compression load is provided by the single preloaded bias spring.

4. The three-stage self-resetting buckling isolator of claim 3, wherein the floating socket comprises cap at the first end.

5. The three-stage self-resetting buckling isolator of claim 3, wherein the interface for coupling the first end to one of a platform or a base comprises a universal joint, and the interface for coupling the second end to the other of a platform or a base comprises a universal joint.

6. A method for mounting a sensor assembly to a vehicle for reduce shock loads of the sensor assembly, the method comprising:

securing a first end of each of a plurality of three-stage self-resetting buckling isolators to a vehicle; and securing a second end of each of the plurality of three-stage self-resetting buckling isolator to a platform, the platform being connected to payload mount system in support of a payload, wherein an elastomeric pad is supported by the platform and is situated between the platform and the payload mount system, the elastomeric pad being operable to dampen vibrations of the payload mount system, wherein each of the three-stage self-resetting buckling isolators are operable in a rigid stage, a compression stage, and a tension stage, wherein the plurality of three-stage self-resetting buckling isolators operate to inhibit movement of the payload relative to the vehicle when in the rigid stage, and wherein each of the three-stage self-resetting buckling isolators comprise a preloaded coupler coupling the first end of the three-stage self-resetting buckling isolator to the second end of the three-stage self-resetting buckling isolator and facilitating relative axial movement between the first end and the second end of the three-stage self-resetting buckling isolator, the preloaded coupler comprising:

a single preloaded bias spring;

a floating socket having an internal cavity, a first end of the floating socket having a first aperture and a second end of the floating socket having a second aperture;

a fixed socket coupled to the first end of the three-stage self-resetting buckling isolator and extending through the first aperture, the fixed socket comprising a longitudinal slot and a first pin extending radially outward away from the fixed socket;

a shaft coupled to the second end of the three-stage self-resetting buckling isolator and extending through the second aperture, the shaft comprising a second pin extending radially outward from the shaft and extending through the longitudinal slot; and a floating sleeve located within the internal cavity and located about the fixed socket, the floating sleeve slidable relative to the fixed socket and the floating socket;

wherein the single preloaded bias spring biases the floating sleeve away from the first end of the floating socket; and wherein the first pin is located between the floating sleeve and the second end of the floating socket and is configured to cause the floating socket to move towards the first end of the floating socket in response to compression of the three-stage self-resetting buckling isolator, and the second pin is located between the floating sleeve and the second end of the floating socket and is configured to cause the floating socket to move towards the first end of the floating socket in response to elongation of the three-stage self-resetting buckling isolator.

7. The method of claim 6, wherein the plurality of three-stage self-resetting buckling isolators comprises six three-stage self-resetting buckling isolators.

8. The method of claim 6, wherein the first end of each three-stage self-resetting buckling isolator is secured to the vehicle by a universal joint and the second end of each three-stage self-resetting buckling isolator is secured to the payload mount system by a universal joint.

9. The method of claim 6, wherein the payload mount system is supported in a position below the vehicle.

10. The method of claim 6, wherein the plurality of three-stage self-resetting buckling isolators operate in the tension stage when a dynamic load exceeds a threshold tension load.

11. The method of claim 6, wherein the plurality of three-stage self-resetting buckling isolators operate in the compression stage when a dynamic load exceeds a threshold compression load.

* * * * *